W. F. KAHL.
MEDICAL SPOON.
APPLICATION FILED MAY 21, 1910.

1,000,178.

Patented Aug. 8, 1911.

Witnesses
O. B. Baenziger.
N. V. Beller

Inventor
William F. Kahl
By Parker & Burton,
Attorneys

UNITED STATES PATENT OFFICE.

WILLIAM F. KAHL, OF DETROIT, MICHIGAN.

MEDICAL SPOON.

1,000,178.  Specification of Letters Patent.  Patented Aug. 8, 1911.

Application filed May 21, 1910. Serial No. 562,586.

*To all whom it may concern:*

Be it known that I, WILLIAM F. KAHL, a citizen of the United States, residing at Detroit, county of Wayne, State of Michigan, have invented a certain new and useful Improvement in Medical Spoons, and declare the following to be a full, clear, and exact description of the same, such as will enable others skilled in the art to which it pertains to make and use the same, reference being had to the accompanying drawings, which form a part of this specification.

My invention relates to medicine spoon adapted to be used by physicians and nurses, and consists in the arrangement and combinations hereinafter described and claimed.

Figure 1:
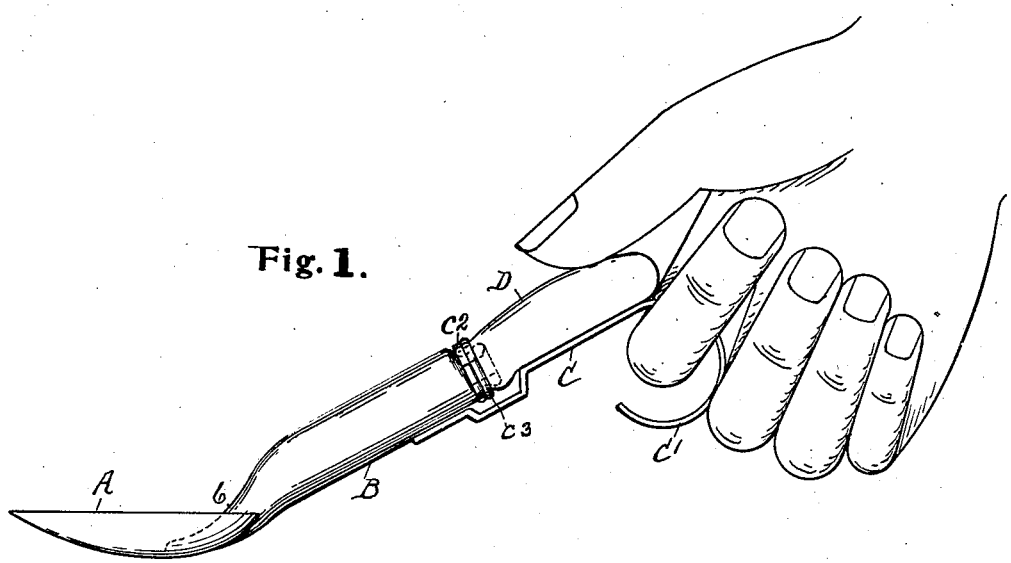
Figure 2:
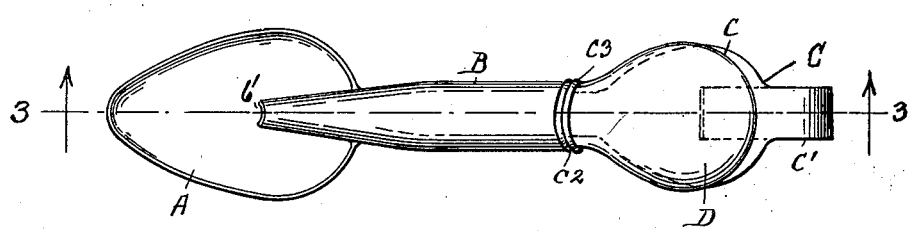
Figure 3:
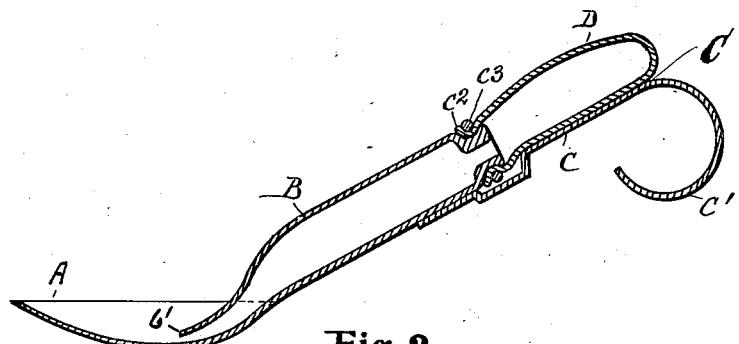

In the drawings, Figure 1, represents the spoon showing the manner of its use. Fig. 2, is a plan view. Fig. 3, is a detail sectional view through the lines 3—3, Fig. 2.

Similar letters refer to similar parts.

In the drawings, A is the bowl of a spoon; B, is a hollow handle of peculiar shape being firmly attached to and integral with the bowl of the spoon A; C, is a supplementary handle formed integral with or attached to the hollow handle B; D, is a rubber dropper modified in form to suit the conditions but having a rubber bulb of the ordinary rubber bulb type attached to droppers; it will be noted in Fig. 2, in the plan view, that this rubber bulb is flattened and is supported by a widened portion $c$, of the handle C.

The handle C, is curved at $c^1$, so that it may be readily grasped and held by the fingers of a person's hand in the manner shown in Fig. 1, with the thumb actuating the elastic bulb D, compressing it if desired against the enlarged or widened portion of the handle C. The bulb fits over the enlargement or neck of the dropper handle at $c^2$ in the usual manner of attaching such bulbs, or it may be held thereon by a ring $c^3$. The dropper portion of the handle B, is tapered down at $b$, and finally terminates in a rectangular mouth $b^1$, of sufficiently small dimensions to be operated as the mouthpiece of a dropper. It will be noted in Fig. 3, that this mouth $b^1$, is in the bottom or lower portion of the bowl of the spoon so that whatever liquid there might be therein would be sucked up if desired by the dropper B, due to the action of the bulb D.

It is intended that the volume carried by the dropper B, shall equal or exceed the amount that can be held in the bowl A, of the spoon so that it may all be withdrawn from the bowl if desired. Graduation marks, not shown, may be applied to the bowl so that any given number of drops, so-called, or minims can be correctly measured in conjunction with the dropper either by withdrawing the surplus or, if already withdrawn and contained in the dropper B, it may be allowed to flow into the bowl of the spoon up to the required mark; in this manner, if the spoon be large enough, several doses may be carried thereby and each one graduated as it is desired to administer them without being obliged to refill the bowl of the spoon from a liquid medicine receptacle, thus a very convenient and handy spoon for a nurse is afforded.

The operation is sufficiently obvious from the foregoing description.

Having thus described my invention what I desire to claim is:

1. A medical spoon, having in combination a spoon bowl, a hollow handle extending therefrom provided with a small discharge opening located at the bottom of the bowl cavity and with an opening at the top thereof, an elastic bulb coupled to the handle at its top opening, a pressure plate extending from the handle adjacent to said elastic bulb and adapted to afford a surface against which to compress said bulb, substantially as described.

2. A medical spoon, having in combination a spoon bowl, a hollow handle provided with a small opening located at the bottom of the bowl cavity and communicating therewith and with an opening at the top thereof, an elastic bulb coupled to the handle at its top opening, a tubular extension from said handle adjacent to said bulb and terminating with a curved finger grip, the said extension being adapted to afford a surface against which to compress the bulb, substantially as described.

In testimony whereof, I sign this specification in the presence of two witnesses.

WILLIAM F. KAHL.

Witnesses:
R. A. PARKER,
N. V. BELLES.

Copies of this patent may be obtained for five cents each, by addressing the "Commissioner of Patents, Washington, D. C."